(12) United States Patent
Togino

(10) Patent No.: US 8,351,124 B2
(45) Date of Patent: Jan. 8, 2013

(54) VISUAL DISPLAY DEVICE

(75) Inventor: Takayoshi Togino, Koganei (JP)

(73) Assignee: Olympus Corporation, Toyko (JP)

( * ) Notice: Subject to any disclaimer, the term of this patent is extended or adjusted under 35 U.S.C. 154(b) by 295 days.

(21) Appl. No.: 12/924,300

(22) Filed: Sep. 24, 2010

(65) Prior Publication Data

US 2011/0157709 A1 Jun. 30, 2011

(30) Foreign Application Priority Data

Dec. 24, 2009 (JP) ................................ 2009-292295

(51) Int. Cl.
*G02B 27/14* (2006.01)

(52) U.S. Cl. ........................................ 359/631

(58) Field of Classification Search .................. 359/631, 359/633, 639
See application file for complete search history.

(56) References Cited

U.S. PATENT DOCUMENTS

| | | | |
|---|---|---|---|
| 4,802,750 A | 2/1989 | Welck | |
| 5,311,357 A | 5/1994 | Summer et al. | |
| 2006/0192094 A1* | 8/2006 | Taniguchi et al. | 250/235 |

FOREIGN PATENT DOCUMENTS

| | | |
|---|---|---|
| JP | 8-76034 | 3/1996 |
| JP | 3-92162 | 9/2000 |
| JP | 3486465 | 1/2004 |
| WO | WO 95/19584 | 7/1995 |

* cited by examiner

*Primary Examiner* — Joseph P Martinez
(74) *Attorney, Agent, or Firm* — Kenyon & Kenyon LLP

(57) ABSTRACT

In the visual display device of the present invention, the first reflection plane 11 is so disposed as to face the eye point 4 in order of an optical path of reverse tracing that extends from the eye point 4 to the two-dimensional image displaying plane 3; the second reflection plane 21 is so disposed as to face the two-dimensional image displaying plane 3, and an optical axis connecting the first reflection plane 11 to the eye point 4 is so disposed as to cross an optical axis connecting the second reflection plane 21 to the two-dimensional image displaying plane 3; both the first and second reflection planes 11 and 21 have positive power; and diopter difference S of the position of a virtual image associated with diopter is substantially equal to that of the position of a virtual image associated with convergence.

6 Claims, 16 Drawing Sheets

VISUAL DISPLAY DEVICE

BACKGROUND OF THE INVENTION AND RELATED ART STATEMENT

The present invention relates to a visual display device that makes it possible to observe with both eyes.

What are disclosed in Patent Documents 1 to 4 are examples of a visual display device.

What is disclosed in Patent Document 1 is a visual display device that adopts the following structure: a first reflection plane faces a two-dimensional image displaying element; a second reflection plane is so disposed as to face an eye point; and an optical axis connecting the first reflection plane and the two-dimensional image displaying element is so disposed as to cross an optical axis connecting the second reflection plane and the eye point. Since the visual display device adopts such a structure, the visual display device as a whole is compact in size, the drop in the amount of light in an eyepiece optical system is smaller, and it is possible to appropriately correct aberrations with a wide angle of field.

What is disclosed in Patent Document 2 or 3 is a visual display device that makes it possible to observe a realistic virtual image of an object that is disposed in one direction by observing from the other direction with two reflection planes in a particular shape facing each other.

What is disclosed in Patent Document 4 is a visual display device that creates a three-dimensional image of an object on an space for an observer with two concave mirrors disposed at particular positions relative to the object, as well as a visual display device that makes it possible to combine a three-dimensional image with an image that comes out from a video tape.

[Patent Document 1] Japanese Patent No. 3486465
[Patent Document 2] Japanese Patent No. 3092162
[Patent Document 3] U.S. Pat. No. 4,802,750
[Patent Document 4] U.S. Pat. No. 5,311,357

SUMMARY OF THE INVENTION

According to the present invention, in a visual display device including one two-dimensional image displaying plane on which an observation image is displayed and an eyepiece optical system that forms two eye points to bring the observation image to both eyes of an observer, the eyepiece optical system includes at least a first optical element having a first reflection plane, and a second optical element having a second reflection plane, the first reflection plane is so disposed as to face the eye point in order of an optical path of reverse tracing that extends from the eye point to the two-dimensional image displaying plane, the second reflection plane is so disposed as to face the two-dimensional image displaying plane, and an optical axis connecting the first reflection plane to the eye point is so disposed as to cross an optical axis connecting the second reflection plane to the two-dimensional image displaying plane, both the first and second reflection planes have positive power, and diopter difference S ($m^{-1}$) of the position of a virtual image associated with diopter is substantially equal to that of the position of a virtual image associated with convergence.

The effects of the above configuration will be described. In general, there is a method of enlarging a small display plane for observation with the use of a large transmission or Fresnel lens having positive power. However, the problem is that the device becomes larger in the length direction when the optical path is designed to be linear. It is possible to adopt an eccentric optical path and bend the optical path in order to make the device smaller. However, in such a case, the eccentric angle increases due to interference between an observer and the display plane, resulting in large eccentric aberrations. Therefore, it is not possible to ensure broad eye points and observe a high-definition image.

There has been such a visual display device as so-called HND (Head Mount Display) that provides an observation image with an eyepiece optical system and display element disposed for each eye. In such a visual display device that provides an image that can be observed by both eyes, eccentric aberrations of the eyepiece optical system cannot be ignored when the eccentric optical path is employed.

In an optical system, like that of the present invention, that allows both eyes to observe, since human eyes are separated by 55 to 65 mm, it is not possible to make the broad eye points satisfying the above condition aplanatic. As a result, some aberration occurs. Since such an aberration occurs between two eye points, the position of a virtual image associated with convergence emerges. Meanwhile, the diameter of pupils for observing an image is about 4 mm, the deterioration of the image associated with aberrations is smaller and the change in the position of a virtual image associated with diopter is smaller, resulting in a difference between the position of a virtual image associated with diopter and the position of a virtual image associated with convergence. The difference between the position of a virtual image associated with diopter and the position of a virtual image associated with convergence can be a cause of eye strain of an observer who observes the image.

According to the present invention, the crossed optical paths are adopted with the use of two reflection planes and the two reflection planes are so configured as to act as reflection planes having positive power, thereby making the device smaller and avoiding interference between the display plane and the observer. In the visual display device that can provide a high-definition observation image with a wide angle of field and broad eye points, an observation image is provided in a way that reduces eye strain for an observer by substantially matching the position of a virtual image associated with diopter to the position of a virtual image associated with convergence.

It is more preferable that the diopter difference S ($m^{-1}$) of the position of a virtual image associated with diopter and the diopter difference S ($m^{-1}$) of the position of a virtual image associated with convergence satisfy the following conditional expression (1):

$$-0.5 \leq S \leq 0.5 \tag{1}$$

The effects of the above configuration will be described. The upper limits of the diopter difference S ($m^{-1}$) of the position of a virtual image associated with diopter and of the diopter difference S ($m^{-1}$) of the position of a virtual image associated with convergence are set at 0.5 $m^{-1}$, and the lower limits at −0.5 $m^{-1}$, thereby further reducing eye strain for an observer.

It is more preferable that the diopter difference S ($m^{-1}$) of the position of a virtual image associated with diopter and the diopter difference S ($m^{-1}$) of the position of a virtual image associated with convergence satisfy the following conditional expression (2):

$$-0.2 \leq S \leq 0.2 \tag{2}$$

The effects of the above configuration will be described. The upper limits of the diopter difference S ($m^{-1}$) of the position of a virtual image associated with diopter and of the diopter difference S ($m^{-1}$) of the position of a virtual image associated with convergence are set at 0.2 m$^{-1}$, and the lower limits at −0.2 m$^{-1}$, thereby further reducing eye strain for an observer.

It is more preferable that at least either the first or second reflection plane is a free-form surface.

The effects of the above configuration will be described. Since at least the first or second reflection plane is a free-form surface, it is possible to correct eccentric aberrations that occur asymmetrically in the vertical direction of a screen as well as to reduce the diopter differences S of the position of a virtual image associated with diopter and of the position of a virtual image associated with convergence in an effective manner.

It is more preferable that at least either the first or second reflection plane is of a shape whose curvature gradually decreases in the direction of a line connecting the two eye points as the distance between the first and second reflection planes becomes shorter.

The effects of the above configuration will be described. When the first and second reflection planes having positive power face each other, the conjugate distance decreases as the distance between the first and second reflection planes becomes shorter. The decrease in conjugate distance is a cause of field curvature. According to the present configuration, at least either the first or second reflection plane is of a shape whose curvature gradually decreases in the direction of a line connecting the two eye points (x-direction) as the distance between the first and second reflection planes becomes shorter. Therefore, power is lowered where the distance between the first and second reflection planes is short; it is possible to keep field curvature from occurring.

Since such a shape is adopted, it is possible to solve the following problem: the tilted display plane is observed with both eyes because the position of a virtual image associated with convergence changes asymmetrically in the vertical direction even when the position of a virtual image associated with convergence in the upper portion of an observation screen is different from in the lower portion and the positions of a virtual image associated with diopter are at a constant distance in the upper and lower portions of the screen.

It is more preferable that the free-form surface of the first reflection plane have an X$^2$Y term, allowing the curvature of the direction (x-direction) of a line connecting two eye points to gradually decrease in an effective manner as the distance between the first and second reflection planes decreases. With an appropriate X$^2$Y term provided to a definition formula of the free-form surface, it is possible to easily correct the tilt of an observation virtual image surface associated with convergence.

Moreover, when the focal distance of the first optical element and the focal distance of the second optical element are represented by F1 and F2, respectively, in order of an optical path that extends from the eye point to the two-dimensional image displaying plane, the following conditional expression is satisfied:

$$0.1<|F1/F2|<2 \quad (3).$$

The effects of the above configuration will be described. Exceeding either the lower or upper limit of the above conditional expression means that one optical element has an extreme power. The imbalance of power leads to an increase in eccentric aberrations in the optical system as a whole so that the position of a virtual image associated with diopter is different from the position of a virtual image associated with convergence. According to the present configuration, the balance of power between the first and second optical elements is taken into account to keep eccentric aberrations from happening.

Moreover, at least either the first reflection plane or second reflection plane is a toric surface. In particular, in order to correct astigmatism that occurs frequently, it is desirable that the first reflection plane that is close to an eye point on an optical path extending from the eye point to the display plane be a toric surface. Since the first reflection plane is a toric surface, it is possible to change the curvature of the Y-Z section and X-Z section. Therefore, it is possible to correct astigmatism. It is also possible to correct the position of a virtual image associated with convergence in an effective manner as well as to keep astigmatism from happening.

It is more preferable that both the first and second reflection planes be toric surfaces. Since both planes are toric surfaces, it is possible to further correct the occurrence of astigmatism.

Furthermore, according to the present invention, a two-dimensional image displaying plane can be formed by enlarging and projecting a small display element with the use of a projection optical system. The diameter of a bundle of rays of the projection optical system can be made thinner by disposing a diffusing plane that is diffusible around a projection image, thereby reducing a burden on the projection optical system. It is also possible to provide a wide observation area that allows an observer to observe an observation image even if the observer changes position slightly.

It is also possible to dispose two projection optical systems corresponding to left and right eyeballs to project projection images of the two projection optical systems onto the diffusing plane. At the same time, it is possible to observe a tree-dimensional image by controlling a diffusion angle of the diffusing plane to keep crosstalk from occurring between two images. It is also possible to view a three-dimensional image with both eyes even when polarizing plates and polarized glasses are used or when time-multiplexed displaying is conducted with liquid-crystal shutter glasses. It is also possible that the first optical element positioned so as to face an eye point is made semi-transmissive to act as a so-called combiner to display an image of the outside world and an electronic image in such a way that the images are superimposed.

As described above, according to the present invention, it is possible to reduce eye strain of an observer thanks to the visual display device that enables an image where diopter is substantially matched to convergence to be observed with both eyes.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF PREFERRED EMBODIMENTS

The following describes visual display devices according to Example 1 to Example 5 of the present invention. Incidentally, suppose a virtual image plane to be observed (or object plane in terms of tracing) is 2 meter ahead in the examples below. However, the distance can be set at any value. First, a coordinate system and eccentric plane used in explaining the numerical examples below will be described. Here, an example of FIGS. 1 and 2, which illustrate Example 1, will be used for description; the same description is applied to the coordinate systems and eccentric planes of the other examples.

Figure 1:
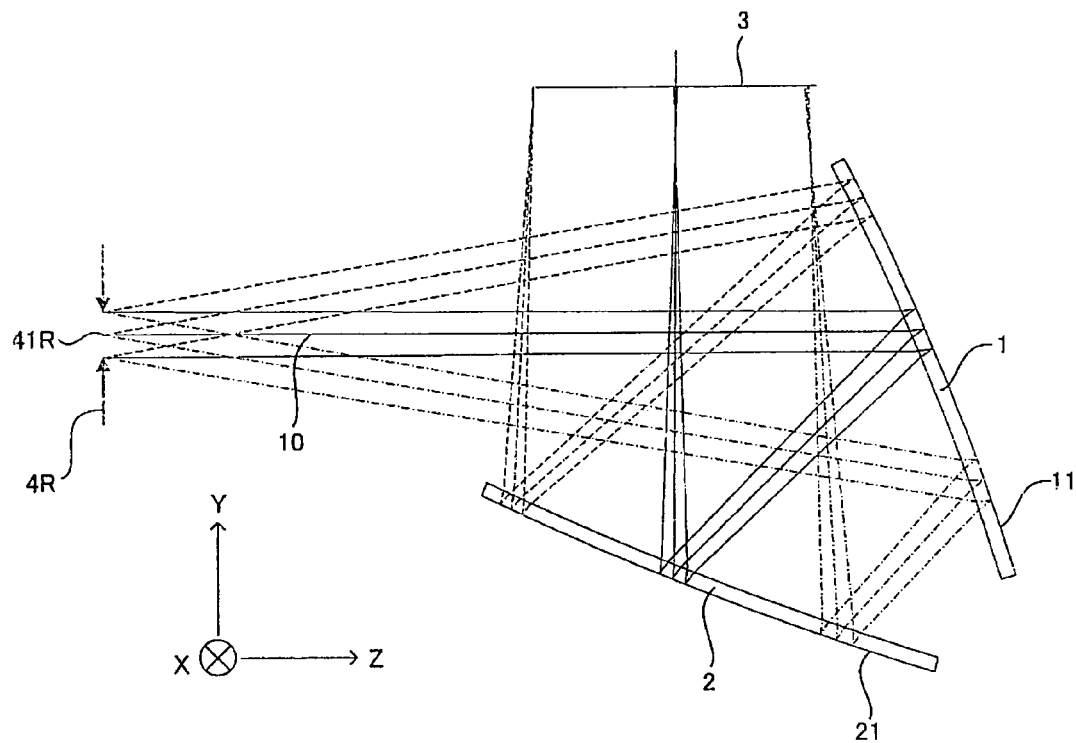
FIG. 1 is a Y-Z cross-sectional diagram containing a central optical ray of an optical system according to Example 1 of the present invention and also a projection view of optical rays.
Figure 2:
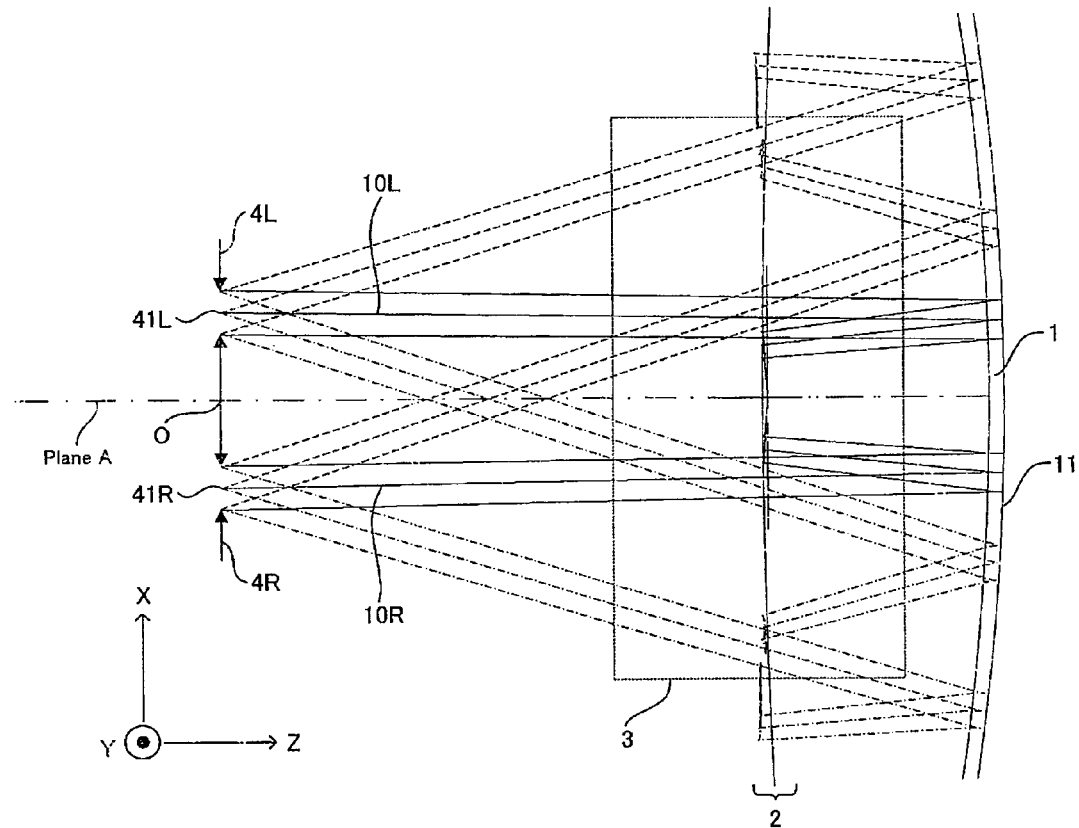
FIG. 2 is an X-Z cross-sectional diagram containing the central optical ray of the optical system according to Example 1 of the present invention and also a projection view of optical rays.

FIG. 1 is a Y-Z cross-sectional diagram containing a central optical ray of an optical system according to Example 1 and also a projection view of optical rays. FIG. 2 is an X-Z cross-sectional diagram containing the central optical ray of the optical system according to Example 1 and also a projection view of optical rays. As shown in FIG. 2, the middle point between both left and right diaphragms' centers 41L and 41R is origin O. The optical system of the present embodiment is so disposed as to be perpendicular to a line connecting both left and right diaphragms' centers 41L and 41R and symmetrical about a plane A (Y-Z plane) containing the origin O. Incidentally, according to each of the examples, the distance between both left and right diaphragms' centers 41L and 41R, or pupil distance of both eyes of an observer, is designed to be 60 mm.

FIG. 1 shows a cross-sectional view of the device taken along a plane parallel to a plane A with the right diaphragm's center 41R being included, as well as a projection view of optical rays travelling toward the plane parallel to the plane A. Incidentally, since the optical system of the present embodiment is so disposed as to be symmetrical about the plane A, a cross-sectional diagram, as well as a projection diagram of optical rays, of the left diaphragm's center 41L is the same as in FIG. 1.

As shown in the cross-sectional view, light emitted from the center of an image plane 3 (two-dimensional image displaying plane) has an optical path along which the light is reflected by a reflection plane 21 of a second optical element 2 and by a reflection plane 11 of a first optical element 1 before entering the diaphragm's center 41R. The optical path is defined as a central optical ray 10. When the left and right central optical rays 10L and 10R shown in FIG. 2 are extended, the central optical rays 10R and 10L cross each other. According to the present embodiment, a line connecting the origin O and the point where the central optical rays 10R and 10L cross each other is z-axis. In FIG. 1, the positive direction of the z-axis and the right direction of the Y-Z plane are the same; the positive direction of the x-axis is the direction from the front side of the paper to the back side. In FIG. 2, the positive direction of the z-axis and the right direction of the X-Z plane are the same; the positive direction of the y-axis is the direction from the back side of the paper to the front side.

As for the eccentric plane, the following are provided: the eccentricity of a plane-top position of the plane from the center of the origin of the optical system (X, Y and Z for x-axis direction, y-axis direction and z-axis direction, respectively; Unit: mm); and tilting angles with the x-, y- and z-axes of the central axes (as for a free-form surface, see the z-axis of the formula (a) described below) of the plane serving as centers ($\alpha$, $\beta$ and $\gamma$, respectively; Unit: degree). In this case, the positive directions of $\alpha$ and $\beta$ are counterclockwise relative to the positive directions of the corresponding axes; the positive direction of $\gamma$ is clockwise relative to the positive direction of the z-axis. Incidentally, the following describes how to rotate $\alpha$, $\beta$ and $\gamma$ of the central axes of the plane: the central axes of the plane and the xyz orthogonal coordinate system are rotated counterclockwise around the x-axis $\alpha$ times; the central axes of the plane rotated are then rotated counterclockwise around the y-axis of a new coordinate system $\beta$ times while the coordinate system that has been rotated once is rotated counterclockwise around the y-axis $\beta$ times; and the central axes of the plane that have been rotated twice are rotated clockwise around the z-axis of a new coordinate system $\gamma$ times.

If, among optical working planes that make up the optical system of each of the numerical examples, a specific plane and the plane following the specific plane make up a coaxial optical system, plane separations are provided. Refractive indexes and Abbe numbers are shown relative to the d-ray (with a wavelength of 587.56 nm).

Incidentally, in the data shown below, "e-00n (n is an integer)" means "$\times 10^{-n}$."

As for Example 1, the configuration and numerical example will be described with reference to FIGS. 1 to 3. FIG. 1 is a Y-Z cross-sectional diagram containing a central optical ray of an optical system according to Example 1 and also a projection view of optical rays. FIG. 2 is an X-Z cross-sectional diagram containing the central optical ray of the optical system according to Example 1 and also a projection view of optical rays. What is illustrated in the above diagrams is an optical ray travelling from diaphragms 4 to the image plane 3 (two-dimensional image displaying plane) because of reverse ray tracing.

As shown in FIG. 1, the visual display device of the present embodiment is so formed as to include the image plane 3 (two-dimensional image displaying plane), which displays an image, and an eyepiece optical system, which includes the first optical element 1 and the second optical element 2. The eyepiece optical system forms two eye points (equivalent to the diaphragms 4) to bring an observation image displayed on the image plane 3 to both eyes of an observer.

The image plane 3 can be formed by a variety of display elements. As the display element to form the image plane, the following projection optical systems are available: a projection optical system that directly forms an image at the image plane 3 like a liquid crystal display element and a projection optical system that uses the image plane as a screen. If the projection optical system is adopted, the diameter of a bundle of rays of the projection optical system can be made thinner by disposing a diffusing plane that is diffusible around a projection image, thereby reducing a burden on the projection optical system. It is also possible to provide a wide observation area that allows an observer to observe an observation image even if the observer changes position slightly.

It is also possible to dispose two projection optical systems corresponding to left and right eyeballs to project projection images of the two projection optical systems onto the diffusing plane. At the same time, it is possible to observe a tree-dimensional image by controlling a diffusion angle of the diffusing plane to keep crosstalk from occurring between two images. It is also possible to view a three-dimensional image with both eyes even when polarizing plates and polarized glasses are used or when time-multiplexed displaying is conducted with liquid-crystal shutter glasses.

The first optical element 1 and second optical element 2 are optical elements that have the first reflection plane 11 and second reflection plane 21 (which are what are called "back-surface mirrors"), respectively, on the back sides. The first optical element 1, which is positioned so as to face an eye point, may be made semi-transmissive to act as a so-called combiner to display an image of the outside world and an electronic image in such a way that the images are superimposed.

An image formed on the image plane 3 (two-dimensional image displaying plane) is reflected by the second reflection plane 21 of the second optical element 2 and by the first reflection plane 11 of the first optical element 1 before being brought to the diaphragms 4 through which an observer observes the image. According to the present embodiment, since the position of a virtual image associated with diopter is substantially the same as the position of a virtual image associated with convergence, an observation image is provided in a way that reduces eye strain for an observer. The position of a virtual image associated with diopter and the position of a virtual image associated with convergence, as well as the differences in diopter of both the positions, will be described later along with those of the other examples.

Figure 3:
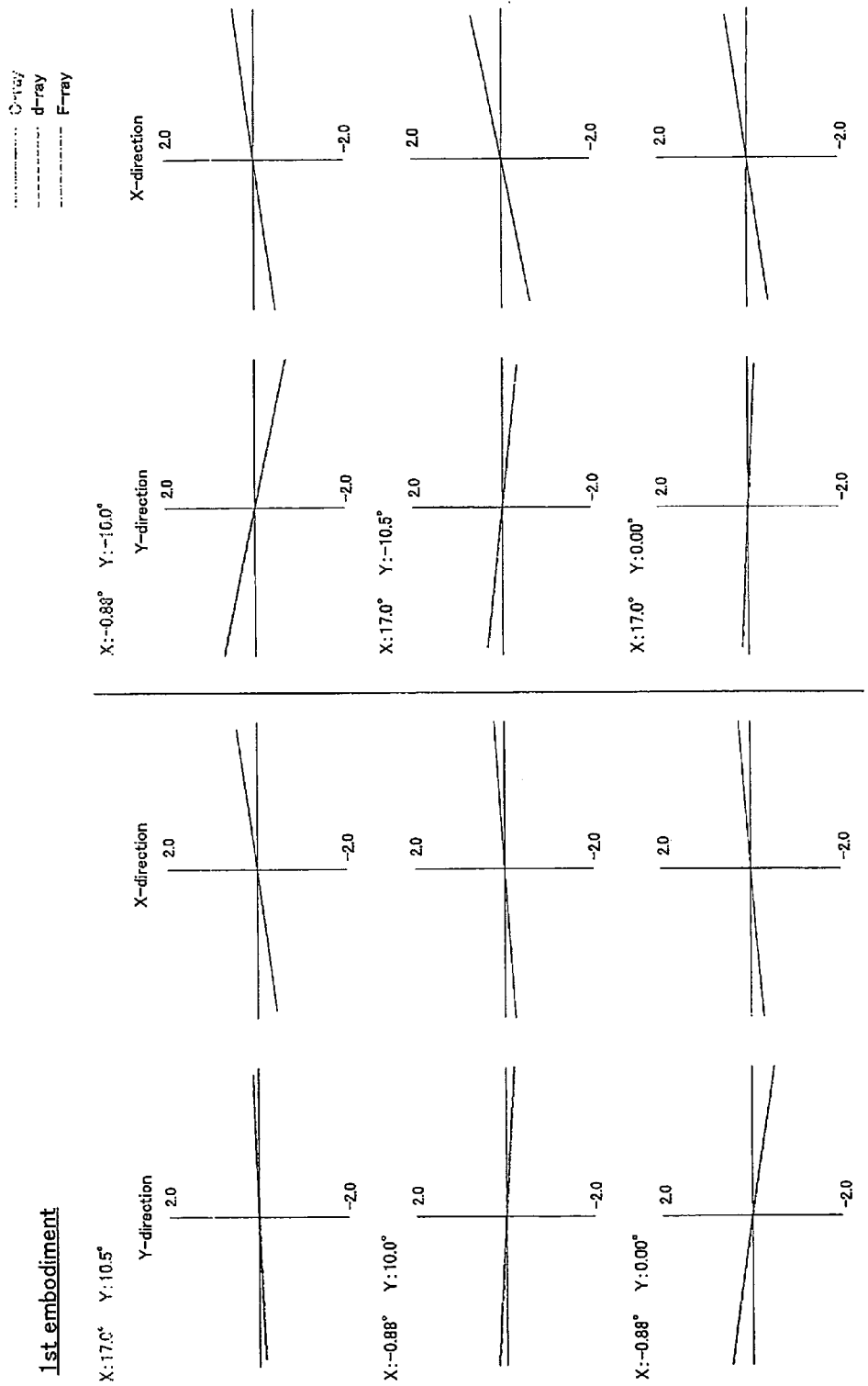
FIG. 3 is a diagram showing lateral aberrations of the entire optical system according to Example 1 of the present invention.

FIG. 3 is a diagram showing lateral aberrations of the entire optical system of Example 1. In the diagram showing lateral aberrations, top-left angles represent a "horizontal angle of field and vertical angle of field"; lateral aberrations of the y-direction (meridional direction) and x-direction (sagittal direction) are shown with the above angles of field. Incidentally, as for a horizontal angle of field, a minus angle of field represents a clockwise angle when facing in the positive direction of the y-axis; as for a vertical angle of field, a minus angle of field represents a clockwise angle when facing in the positive direction of the x-axis.

Numerical Example 1

| | Unit mm | | | | |
|---|---|---|---|---|---|
| | Angle of view 35° | | | | |
| | Vertical angle of view 20° | | | | |
| | Radius of entrance pupil (Reverse ray tracing) 15.00 | | | | |
| Surface No. | Curvature radius | Plane gap | Displacement and tilt | Refractive index | Abbe No. |
| Object Plane | Cylindrical [1] | −2000.00 | | | |
| 1 | Stop | | (1) | | |
| 2 | −822.82 | | (2) | 1.4918 | 57.4 |
| 3 | −822.82 (Reflective) | | (3) | 1.4918 | 57.4 |
| 4 | −822.82 | | (2) | | |
| 5 | 1044.14 | | (4) | 1.4918 | 57.4 |
| 6 | 1044.14 (Reflective) | | (5) | 1.4918 | 57.4 |
| 7 | 1044.14 | | (4) | | |
| Image Plane | ∞ | | (6) | | |

| Cylindrical [1] | |
|---|---|
| X-direction curvature radius | −2000.00 |
| Y-direction curvature radius | ∞ |

| Displacement and tilt (1) | | | | | |
|---|---|---|---|---|---|
| X | 30.00 | Y | 0.00 | Z | 0.00 |
| α | 0.00 | β | 0.00 | γ | 0.00 |
| Displacement and tilt (2) | | | | | |
| X | 0.00 | Y | 0.00 | Z | 255.00 |
| α | 22.50 | β | 0.00 | γ | 0.00 |
| Displacement and tilt (3) | | | | | |
| X | 0.00 | Y | 0.00 | Z | 260.00 |
| α | 22.50 | β | 0.00 | γ | 0.00 |
| Displacement and tilt (4) | | | | | |
| X | 0.00 | Y | −75.00 | Z | 180.00 |
| α | 67.50 | β | 0.00 | γ | 0.00 |
| Displacement and tilt (5) | | | | | |
| X | 0.00 | Y | −80.00 | Z | 180.00 |
| α | 67.50 | β | 0.00 | γ | 0.00 |
| Displacement and tilt (6) | | | | | |
| X | 0.00 | Y | 78.98 | Z | 181.58 |
| α | 90.00 | β | 0.00 | γ | 0.00 |

Figure 4:
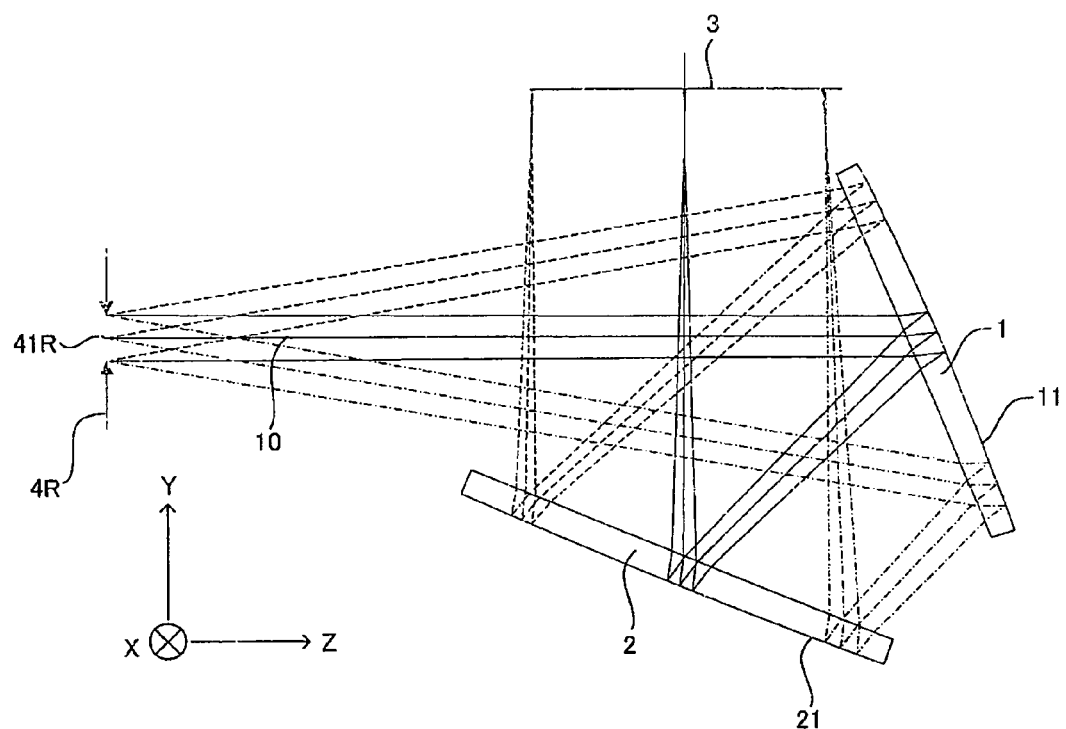
FIG. 4 is a Y-Z cross-sectional diagram containing a central optical ray of an optical system according to Example 2 of the present invention and also a projection view of optical rays.
Figure 5:
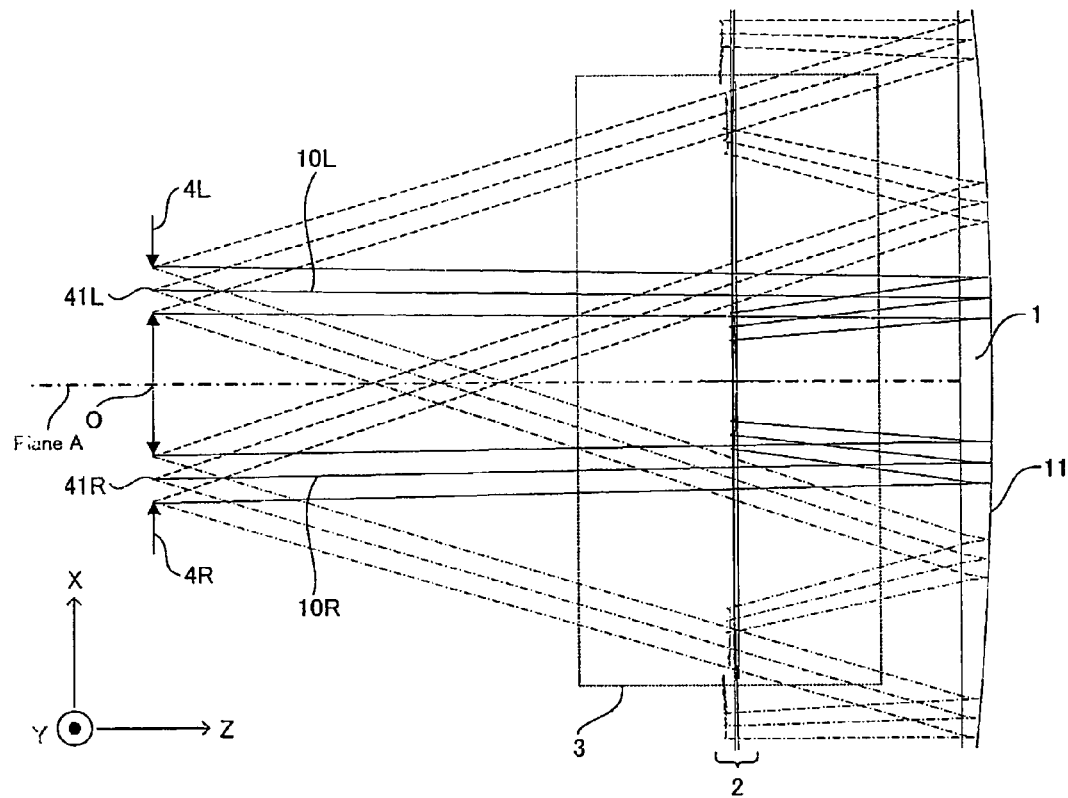
FIG. 5 is an X-Z cross-sectional diagram containing the central optical ray of the optical system according to Example 2 of the present invention and also a projection view of optical rays.

As for Example 2, the configuration and numerical example will be described with reference to FIGS. 4 to 6. FIG. 4 is a Y-Z cross-sectional diagram containing a central optical ray of an optical system according to Example 2 and also a projection view of optical rays. FIG. 5 is an X-Z cross-sectional diagram containing the central optical ray of the optical system according to Example 2 and also a projection view of optical rays. What is illustrated in the above diagrams is an optical ray travelling from diaphragms 4 to the image plane 3 (two-dimensional image displaying plane) because of reverse ray tracing.

As shown in FIG. 4, the visual display device of the present embodiment is so formed as to include the image plane 3 (two-dimensional image displaying plane), which displays an image, and an eyepiece optical system, which includes the first optical element 1 and the second optical element 2. The eyepiece optical system forms two eye points (equivalent to the diaphragms 4) to bring an observation image displayed on the image plane 3 to both eyes of an observer.

The image plane 3 represents a plane on which an image is displayed. As described in Example 1, the image plane 3 can be formed by a variety of display elements including a projection optical system.

The first optical element 1 and second optical element 2 are optical elements that have the first reflection plane 11 and second reflection plane 21 (which are what are called "back-surface mirrors"), respectively, on the back sides. In particular, according to the present embodiment, in each optical element, the shape of the side through which light enters (which is flat with a curvature radius of ∞ according to the present embodiment) is different from the shape of the side (reflection plane) that reflects light, thereby enabling the device to be designed in a way that reduces eccentric aberrations. Incidentally, the first optical element 1, which is positioned so as to face an eye point, may be made semi-transmissive to act as a so-called combiner to display an image of the outside world and an electronic image in such a way that the images are superimposed.

An image formed on the image plane 3 (two-dimensional image displaying plane) is reflected by the second reflection plane 21 of the second optical element 2 and by the first reflection plane 11 of the first optical element 1 before being brought to the diaphragms 4 through which an observer observes the image. According to the present embodiment, since the position of a virtual image associated with diopter is substantially the same as the position of a virtual image associated with convergence, an observation image is provided in a way that reduces eye strain for an observer. The position of a virtual image associated with diopter and the position of a virtual image associated with convergence, as well as the differences in diopter of both the positions, will be described later along with those of the other examples.

Figure 6:
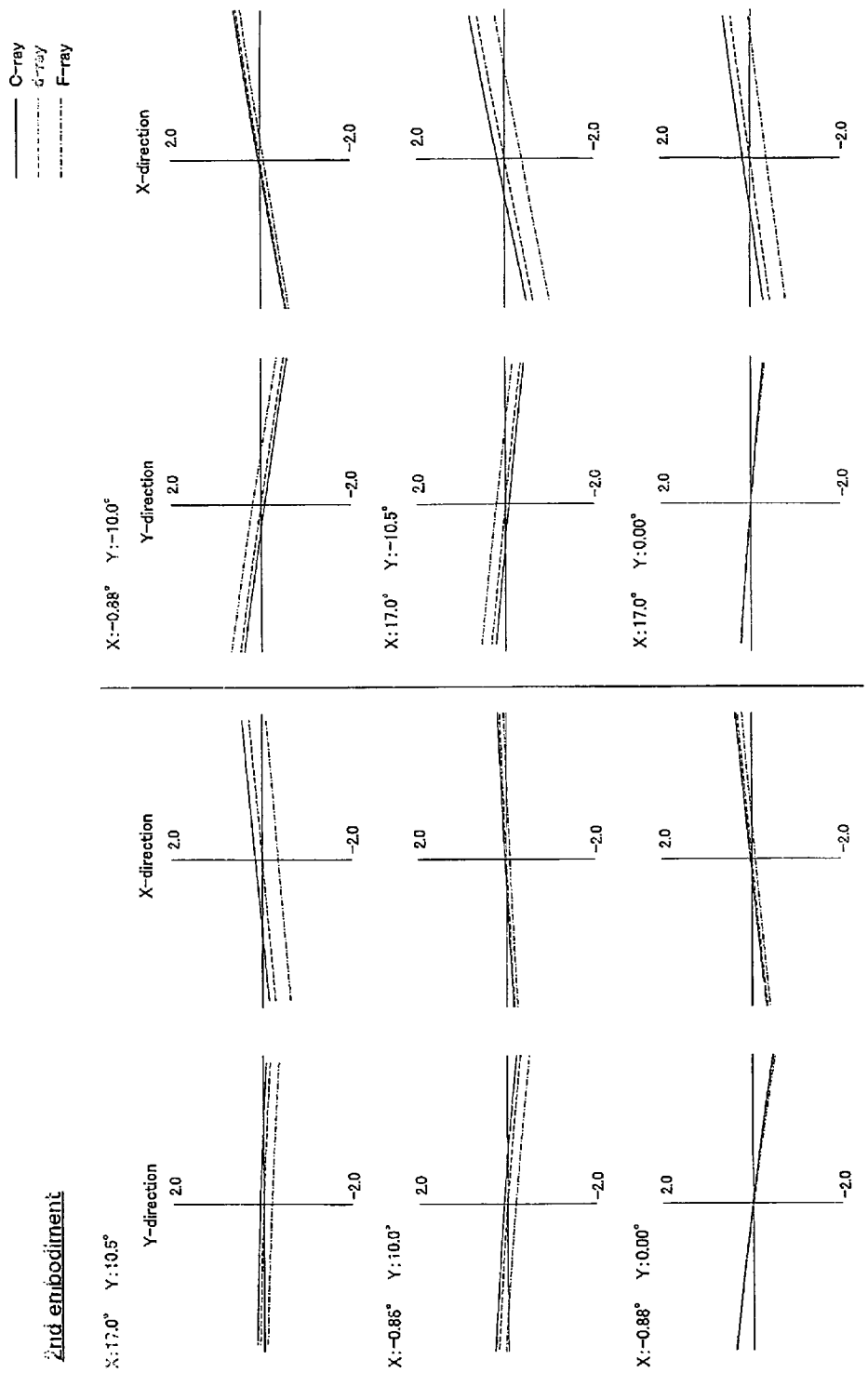
FIG. 6 is a diagram showing lateral aberrations of the entire optical system according to Example 2 of the present invention.

FIG. 6 is a diagram showing lateral aberrations of the entire optical system of Example 2. In the diagram showing lateral aberrations, top-left angles represent a "horizontal angle of field and vertical angle of field"; lateral aberrations of the y-direction (meridional direction) and x-direction (sagittal direction) are shown with the above angles of field. Incidentally, as for a horizontal angle of field, a minus angle of field represents a clockwise angle when facing in the positive direction of the y-axis; as for a vertical angle of field, a minus angle of field represents a clockwise angle when facing in the positive direction of the x-axis.

Numerical Example 2

Unit mm
Angle of view 35°
Vertical angle of view 20°
Radius of entrance pupil (Reverse ray tracing) 15.00

| Surface No. | Curvature radius | Plane gap | Displacement and tilt | Refractive index | Abbe No. |
|---|---|---|---|---|---|
| Object Plane | Cylindrical [1] | −2000.00 | | | |
| 1 | Stop | | (1) | | |
| 2 | ∞ | | (2) | 1.4918 | 57.4 |
| 3 | −1133.47 (Reflective) | | (3) | 1.4918 | 57.4 |
| 4 | ∞ | | (2) | | |
| 5 | ∞ | | (4) | 1.4918 | 57.4 |
| 6 | 2573.09 (Reflective) | | (5) | 1.4918 | 57.4 |
| 7 | ∞ | | (4) | | |
| Image Plane | ∞ | | (6) | | |

Cylindrical [1]

| X-direction curvature radius | −2000.00 |
|---|---|
| Y-direction curvature radius | ∞ |

Displacement and tilt (1)

| X | 30.00 | Y | 0.00 | Z | 0.00 |
|---|---|---|---|---|---|
| α | 0.00 | β | 0.00 | γ | 0.00 |

Displacement and tilt (2)

| X | 0.00 | Y | 0.00 | Z | 250.00 |
|---|---|---|---|---|---|
| α | 22.50 | β | 0.00 | γ | 0.00 |

Displacement and tilt (3)

| X | 0.00 | Y | 0.00 | Z | 260.00 |
|---|---|---|---|---|---|
| α | 22.50 | β | 0.00 | γ | 0.00 |

Displacement and tilt (4)

| X | 0.00 | Y | −70.00 | Z | 180.00 |
|---|---|---|---|---|---|
| α | 67.50 | β | 0.00 | γ | 0.00 |

Displacement and tilt (5)

| X | 0.00 | Y | −80.00 | Z | 180.00 |
|---|---|---|---|---|---|
| α | 67.50 | β | 0.00 | γ | 0.00 |

Displacement and tilt (6)

| X | 0.00 | Y | 78.98 | Z | 181.35 |
|---|---|---|---|---|---|
| α | 90.00 | β | 0.00 | γ | 0.00 |

Figure 7:
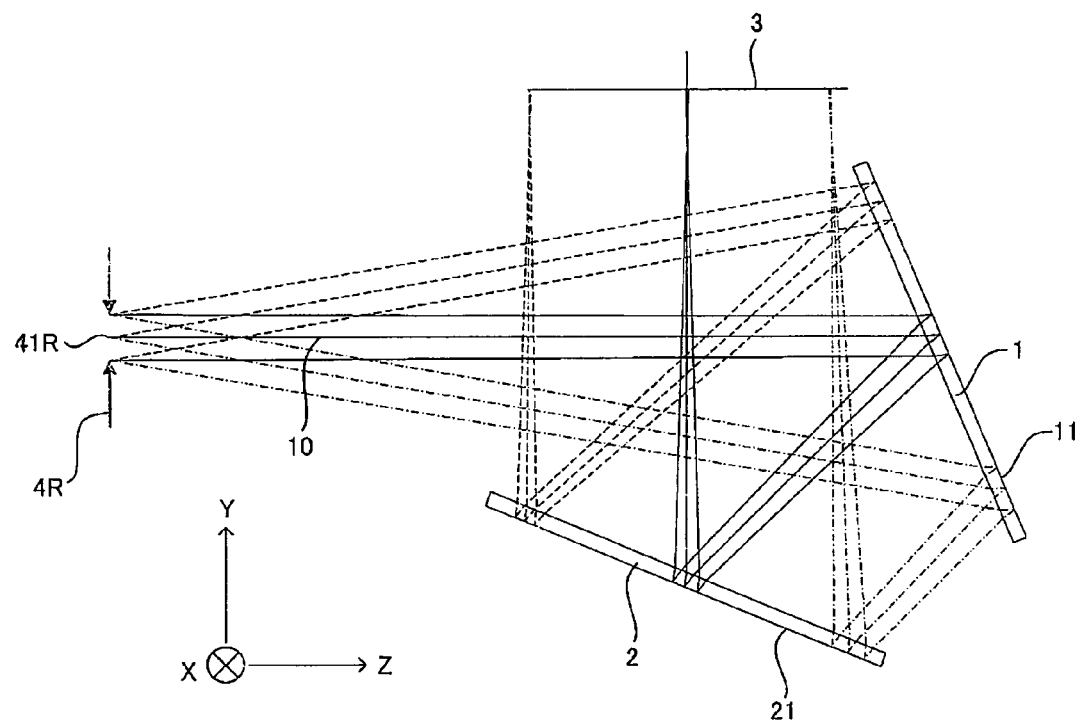
FIG. 7 is a Y-Z cross-sectional diagram containing a central optical ray of an optical system according to Example 3 of the present invention and also a projection view of optical rays.
Figure 8:
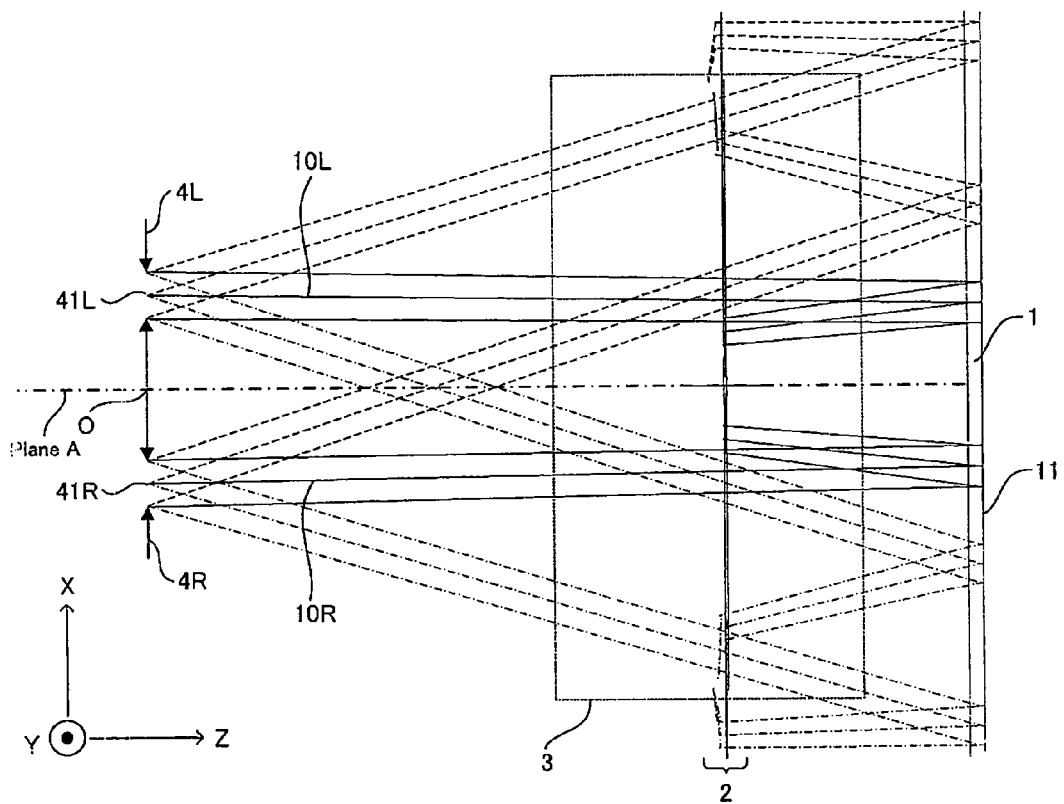
FIG. 8 is an X-Z cross-sectional diagram containing the central optical ray of the optical system according to Example 3 of the present invention and also a projection view of optical rays.

As for Example 3, the configuration and numerical example will be described with reference to FIGS. 7 to 9. FIG. 7 is a Y-Z, cross-sectional diagram containing a central optical ray of an optical system according to Example 3 and also a projection view of optical rays. FIG. 8 is an X-Z cross-sectional diagram containing the central optical ray of the optical system according to Example 3 and also a projection view of optical rays. What is illustrated in the above diagrams is an optical ray travelling from diaphragms 4 to the image plane 3 (two-dimensional image displaying plane) because of reverse ray tracing.

As shown in FIG. 7, the visual display device of the present embodiment is so formed as to include the image plane 3 (two-dimensional image displaying plane), which displays an image, and an eyepiece optical system, which includes the first optical element 1 and the second optical element 2. The eyepiece optical system forms two eye points (equivalent to the diaphragms 4) to bring an observation image displayed on the image plane 3 to both eyes of an observer.

The image plane 3 represents a plane on which an image is displayed. As described in Example 1, the image plane 3 can be formed by a variety of display elements including a projection optical system.

The first optical element 1 and second optical element 2 are optical elements that have the first reflection plane 11 and second reflection plane 21 (which are what are called "back-surface mirrors"), respectively, on the back sides. In particular, according to the present embodiment, in each optical element, the shape of the side through which light enters (which is flat with a curvature radius of ∞ according to the present embodiment) is different from the shape of the side (reflection plane) that reflects light, thereby enabling the device to be designed in a way that reduces eccentric aberrations. Incidentally, the first optical element 1, which is positioned so as to face an eye point, may be made semi-transmissive to act as a so-called combiner to display an image of the outside world and an electronic image in such a way that the images are superimposed.

An image formed on the image plane 3 (two-dimensional image displaying plane) is reflected by the second reflection plane 21 of the second optical element 2 and by the first reflection plane 11 of the first optical element 1 before being brought to the diaphragms 4 through which an observer observes the image. According to the present embodiment, since the position of a virtual image associated with diopter is substantially the same as the position of a virtual image associated with convergence, an observation image is provided in a way that reduces eye strain for an observer. The position of a virtual image associated with diopter and the position of a virtual image associated with convergence, as well as the differences in diopter of both the positions, will be described later along with those of the other examples.

Figure 9:
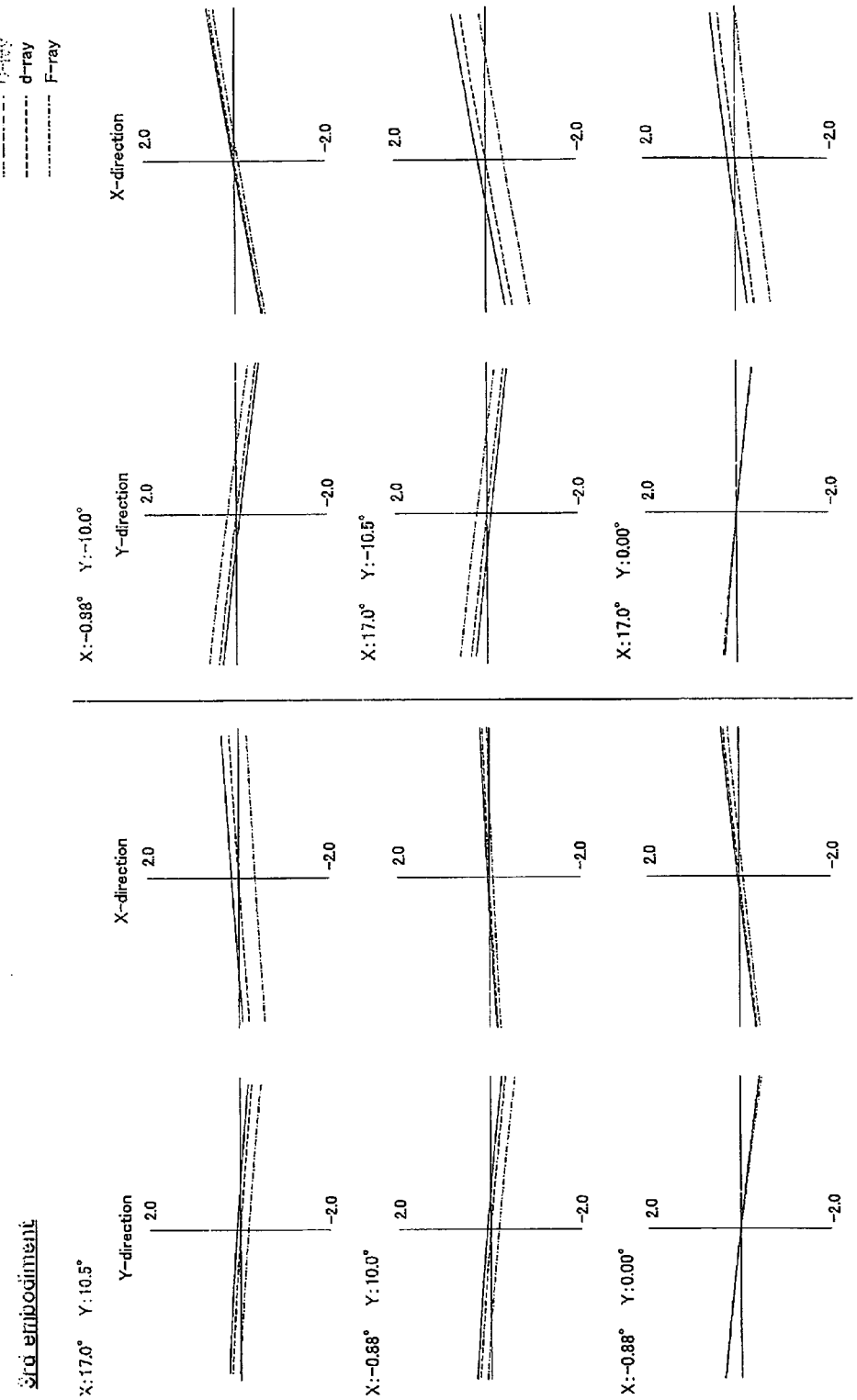
FIG. 9 is a diagram showing lateral aberrations of the entire optical system according to Example 3 of the present invention.

FIG. 9 is a diagram showing lateral aberrations of the entire optical system of Example 3. In the diagram showing lateral aberrations, top-left angles represent a "horizontal angle of field and vertical angle of field"; lateral aberrations of the y-direction (meridional direction) and x-direction (sagittal direction) are shown with the above angles of field. Incidentally, as for a horizontal angle of field, a minus angle of field represents a clockwise angle when facing in the positive direction of the y-axis; as for a vertical angle of field, a minus angle of field represents a clockwise angle when facing in the positive direction of the x-axis.

According to the present embodiment, Fresnel surfaces are adopted for the first and second reflection planes 11 and 21. Thanks to the adoption of Fresnel surfaces, the first and second optical elements 1 and 2 can be made thinner, and the device as a whole, in turn, can be made smaller.

Incidentally, k, which defines the Fresnel surface described in the numerical example, is a constant of a cone in the formula below that defines an aspheric surface.

$$Z=(y^2/R)/[1+\{1-(1+k)y^2/R^2\}^{1/2}]+Ay^4+By^6+Cy^8+Dy^{10}+\ldots$$

where R represents a paraxial curvature radius and A, B, C and D represent fourth-order, sixth-order, eighth-order and tenth-order aspheric coefficients. For the Fresnel surfaces of the present embodiment, the aspheric coefficients come to 0.

Numerical Example 3

| Unit mm Angle of view 35° Vertical angle of view 20° Radius of entrance pupil (Reverse ray tracing) 15.00 | | | | | |
|---|---|---|---|---|---|
| Surface No. | Curvature radius | Plane gap | Displacement and tilt | Refractive index | Abbe No. |
| Object Plane | Cylindrical [1] | −2000.00 | | | |
| 1 | Stop | | (1) | | |
| 2 | ∞ | | (2) | 1.4918 | 57.4 |
| 3 | Fresnel [1] (Reflective) | | (3) | 1.4918 | 57.4 |
| 4 | ∞ | | (2) | | |
| 5 | ∞ | | (4) | 1.4918 | 57.4 |
| 6 | Fresnel [2] (Reflective) | | (5) | 1.4918 | 57.4 |
| 7 | ∞ | | (4) | | |
| Image Plane | ∞ | | (6) | | |

| Fresnel [1] | |
|---|---|
| Curvatre radius | −1152.59 |
| k | 0 |

| Fresnel [2] | |
|---|---|
| curvatre radius | 2813.34 |
| k | 0 |

| Cylindrical [1] | |
|---|---|
| X-direction curvature radius | −2000.00 |
| Y-direction curvature radius | ∞ |

| Displacement and tilt (1) | | | | | |
|---|---|---|---|---|---|
| X | 30.00 | Y | 0.00 | Z | 0.00 |
| α | 0.00 | β | 0.00 | γ | 0.00 |

| Displacement and tilt (2) | | | | | |
|---|---|---|---|---|---|
| X | 0.00 | Y | 0.00 | Z | 255.00 |
| α | 22.50 | β | 0.00 | γ | 0.00 |

| Displacement and tilt (3) | | | | | |
|---|---|---|---|---|---|
| X | 0.00 | Y | 0.00 | Z | 260.00 |
| α | 22.50 | β | 0.00 | γ | 0.00 |

| Displacement and tilt (4) | | | | | |
|---|---|---|---|---|---|
| X | 0.00 | Y | −75.00 | Z | 180.00 |
| α | 67.50 | β | 0.00 | γ | 0.00 |

| Displacement and tilt (5) | | | | | |
|---|---|---|---|---|---|
| X | 0.00 | Y | −80.00 | Z | 180.00 |
| α | 67.50 | β | 0.00 | γ | 0.00 |

| Displacement and tilt (6) | | | | | |
|---|---|---|---|---|---|
| X | 0.00 | Y | 78.98 | Z | 180.80 |
| α | 90.00 | β | 0.00 | γ | 0.00 |

The above has described the configurations and numerical examples of Example 1 to Example 3. According to the above examples, a spherical or Fresnel surface is adopted for the shape of the first and second reflection planes 11 and 21. Example 4 and Example 5 described below are characterized by adopting a free-form surface for the shape of the first and second reflection planes 11 and 21. The adoption of the free-form surface makes it possible to correct eccentric aberrations that occur asymmetrically in the vertical direction of a screen as well as to reduce the differences S in diopter of the position of a virtual image associated with diopter and of the position of a virtual image associated with convergence in an effective manner. Incidentally, the free-form surface may be adopted not only for both the first reflection plane 11 and second reflection plane 21 as in the cases of the above examples but for either the first reflection plane 11 or second reflection plane 21. Incidentally, the plane indicated by FFS is a free-form surface.

The free-form surface used by the present invention is defined by the following formula (a). Incidentally, the z-axis of the definition formula serves as the axis of the free-form surface.

[Formula 1]
where the first term of the formula (a) is a spherical term and the second and subsequent terms are free-form surface terms.
In the Spherical Term:
R: Curvature radius of a vertex
K: Conic constant of $r=\sqrt{(X^2+Y^2)}$
In the Free-Form Surface Terms:
[Formula 2]
where Cj (j is an integer equal to 1 or greater) is a coefficient.

In general, the above free-form surface does not have a symmetry plane on both the X-Z and Y-Z planes. According to the present invention, all the odd-order terms of X are set at 0. Therefore, the free-form surface has one symmetry plane that is parallel to the Y-Z plane. In the case of the above definition formula (a), for example, the coefficients of the terms, C2, C5, C7, C9, C12, C14, C16, C18, C20, C23, C25, C27, C29, C31, C33, are each set at 0 so that the free-form surface has one symmetry plane that is parallel to the Y-Z plane.

By setting all the odd-order terms of Y at 0, the free-form surface has one symmetry plane that is parallel to the X-Z plane. In the case of the above definition formula, for example, the coefficients of the terms, C3, C5, C8, C10, C12, C14, C17, C19, C21, C23, C25, C27, C30, C32, C34, C36, . . . , are each set at 0 so that the free-form surface has one symmetry plane that is parallel to the X-Z plane.

Moreover, one of the directions of the symmetry planes is regarded as a symmetry plane. As for the eccentricity of the corresponding direction, the direction of eccentricity of the optical system relative to the symmetry plane parallel to the Y-Z plane is for example set in the y-axis direction, while the direction of eccentricity of the optical system relative to the symmetry plane parallel to the X-Z plane is set in the x-axis direction. Thus, it is possible to correct rotationally asymmetric aberrations resulting from eccentricity in an effective manner as well as to improve productivity.

As mentioned above, the above definition formula (a) is described as one example. The present examples are characterized by using a plane-symmetrical free-form surface having only one symmetry plane to correct rotationally asymmetric aberrations resulting from eccentricity as well as to improve productivity. Needless to say, the same effects can be obtained from any other definition formulas. Incidentally, the terms associated with the free-form surface whose data are not described are set at 0.

Figure 10:
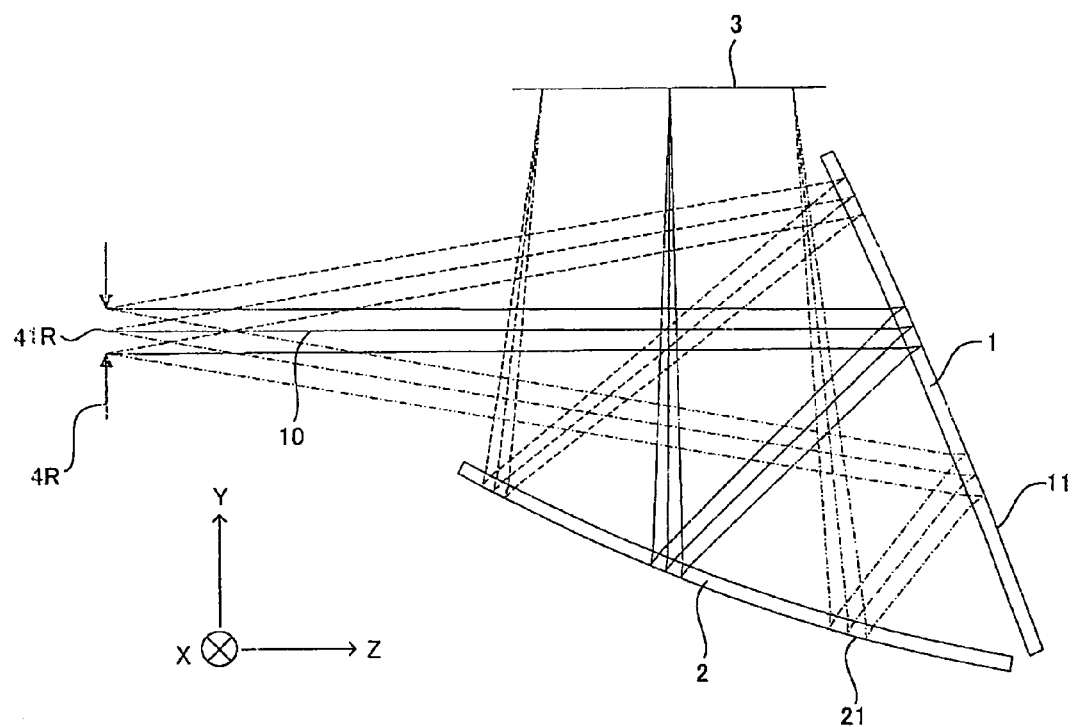
FIG. 10 is a Y-Z cross-sectional diagram containing a central optical ray of an optical system according to Example 4 of the present invention and also a projection view of optical rays.
Figure 11:
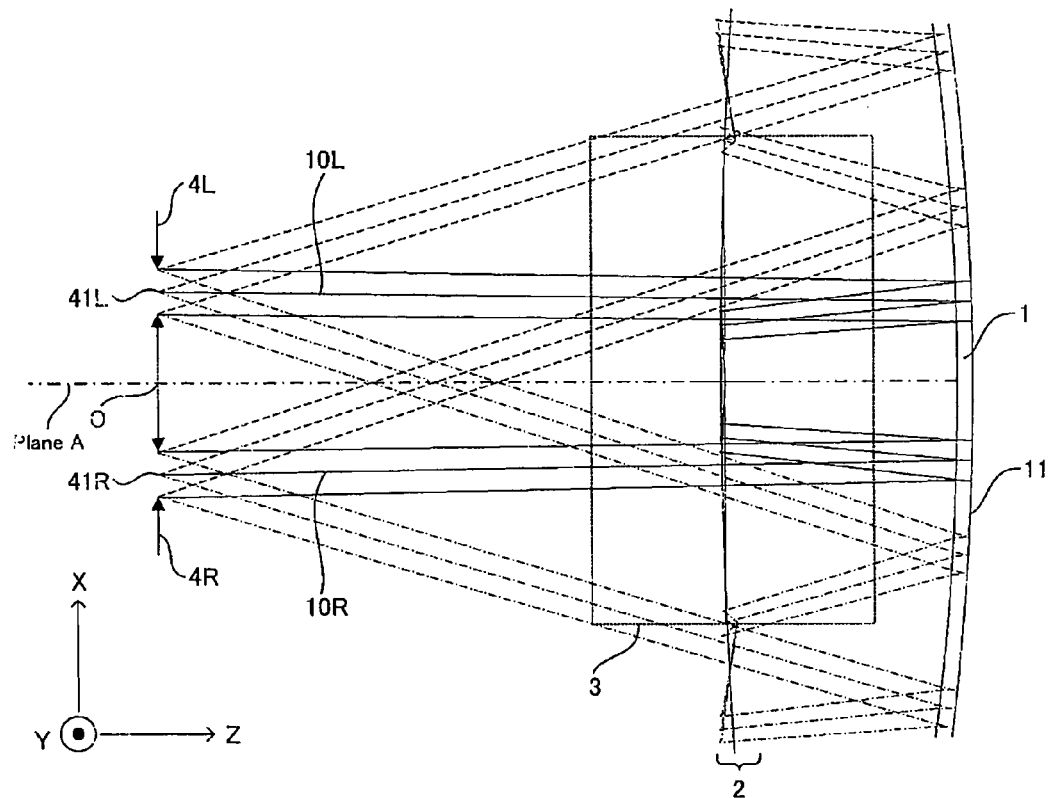
FIG. 11 is an X-Z cross-sectional diagram containing the central optical ray of the optical system according to Example 4 of the present invention and also a projection view of optical rays.

As for Example 4, the configuration and numerical example will be described with reference to FIGS. 10 to 12. FIG. 10 is a Y-Z cross-sectional diagram containing a central optical ray of an optical system according to Example 4 and also a projection view of optical rays. FIG. 11 is an X-Z cross-sectional diagram containing the central optical ray of the optical system according to Example 4 and also a projection view of optical rays. What is illustrated in the above diagrams is an optical ray travelling from diaphragms 4 to the image plane 3 (two-dimensional image displaying plane) because of reverse ray tracing.

As shown in FIG. 10, the visual display device of the present embodiment is so formed as to include the image plane 3 (two-dimensional image displaying plane), which displays an image, and an eyepiece optical system, which includes the first optical element 1 and the second optical element 2. The eyepiece optical system forms two eye points (equivalent to the diaphragms 4) to bring an observation image displayed on the image plane 3 to both eyes of an observer.

The image plane 3 represents a plane on which an image is displayed. As described in Example 1, the image plane 3 can be formed by a variety of display elements including a projection Optical system.

The first optical element 1 and second optical element 2 are optical elements that have the first reflection plane 11 and second reflection plane 21 (which are what are called "back-surface mirrors"), respectively, on the back sides. Incidentally, the first optical element 1, which is positioned so as to face an eye point, may be made semi-transmissive to act as a so-called combiner to display an image of the outside world and an electronic image in such a way that the images are superimposed.

An image formed on the image plane 3 (two-dimensional image displaying plane) is reflected by the second reflection plane 21 of the second optical element 2 and by the first reflection plane 11 of the first optical element 1 before being brought to the diaphragms 4 through which an observer observes the image. According to the present embodiment, since the position of a virtual image associated with diopter is substantially the same as the position of a virtual image associated with convergence, an observation image is provided in a way that reduces eye strain for an observer. The position of a virtual image associated with diopter and the position of a virtual image associated with convergence, as well as the differences in diopter of both the positions, will be described later along with those of the other examples.

Figure 12:
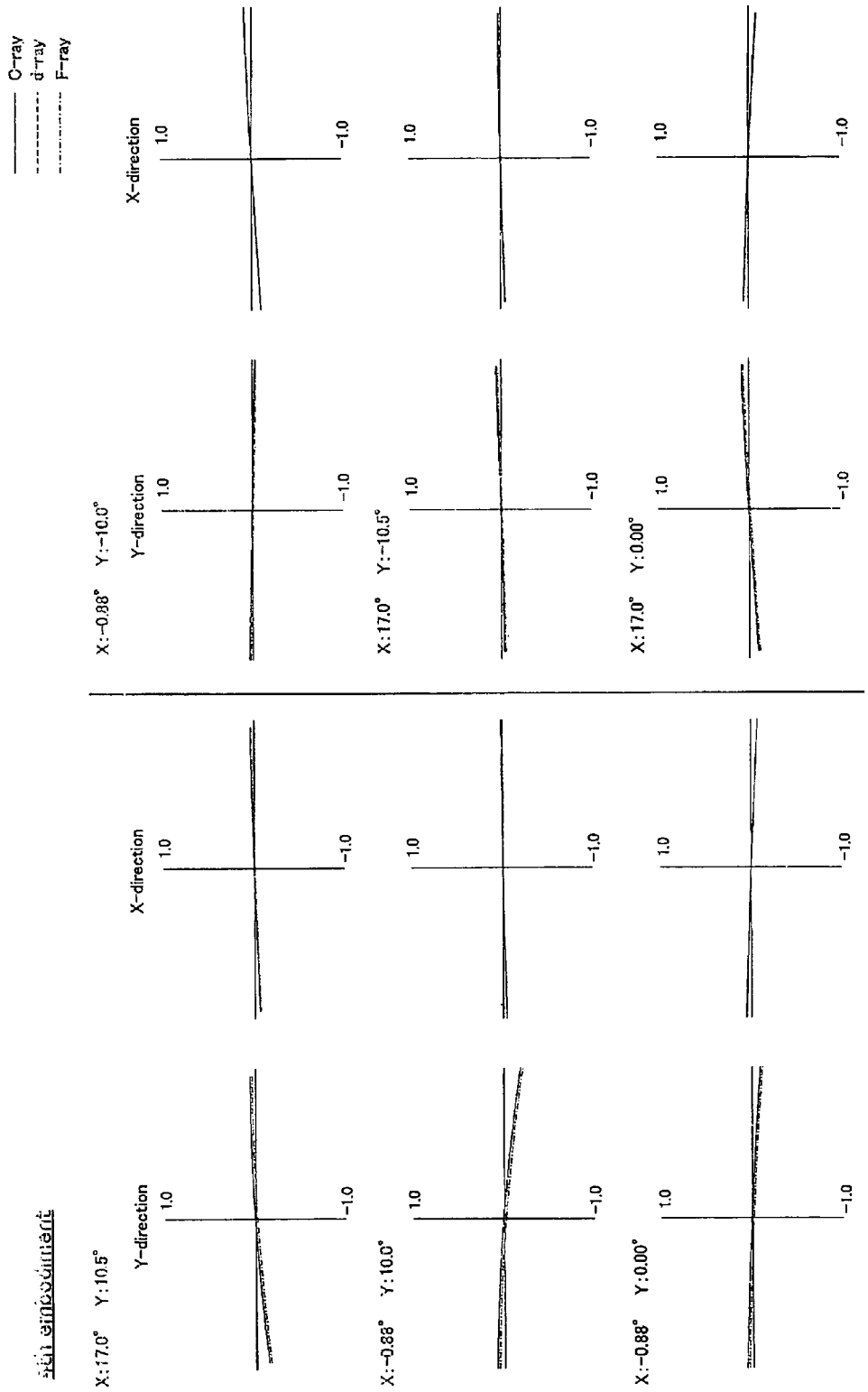
FIG. 12 is a diagram showing lateral aberrations of the entire optical system according to Example 4 of the present invention.

FIG. 12 is a diagram showing lateral aberrations of the entire optical system of Example 4. In the diagram showing lateral aberrations, top-left angles represent a "horizontal angle of field and vertical angle of field"; lateral aberrations of the y-direction (meridional direction) and x-direction (sagittal direction) are shown with the above angles of field. Incidentally, as for a horizontal angle of field, a minus angle of field represents a clockwise angle when facing in the positive direction of the y-axis; as for a vertical angle of field, a minus angle of field represents a clockwise angle when facing in the positive direction of the x-axis.

Numerical Example 4

Unit mm
Angle of view 35°
Vertical angle of view 20°
Radius of entrance pupil (Reverse ray tracing) 15.00

| Surface No. | Curvature radius | Plane gap | Displacement and tilt | Refractive index | Abbe No. |
|---|---|---|---|---|---|
| Object Plane | Cylindrical[1] | −2000.00 | | | |
| 1 | Stop | | (1) | | |
| 2 | FFS[1] | | (2) | 1.4918 | 57.4 |
| 3 | FFS[1] (Reflective) | | (3) | 1.4918 | 57.4 |
| 4 | FFS[1] | | (2) | | |
| 5 | FFS[2] | | (4) | 1.4918 | 57.4 |
| 6 | FFS[2] (Reflective) | | (5) | 1.4918 | 57.4 |
| 7 | FFS[2] | | (4) | | |
| Image Plane | ∞ | | (6) | | |

-continued

Unit mm
Angle of view  35°
Vertical angle of view  20°
Radius of entrance pupil (Reverse ray tracing)  15.00

| Cylindrical[1] | | | |
|---|---|---|---|
| X-direction curvature radius | | −2000.00 | |
| Y-direction curvature radius | | ∞ | |

| FFS[1] | | | | | |
|---|---|---|---|---|---|
| C4 | −5.5587e−004 | C6 | −5.6747e−004 | C8 | 8.0445e−007 |
| C10 | −5.0324e−007 | C11 | −1.1264e−009 | C13 | −5.1668e−009 |
| C15 | −1.5244e−009 | C68 | 1.0000e+000 | | |

| FFS[2] | | | | | |
|---|---|---|---|---|---|
| C4 | 7.0512e−004 | C6 | 4.0881e−004 | C8 | 2.3952e−006 |
| C10 | −5.9781e−007 | C11 | −1.7211e−010 | C13 | −2.5225e−009 |
| C15 | −2.7814e−009 | C68 | 1.0000e+000 | | |

| Displacement and tilt (1) | | | | | |
|---|---|---|---|---|---|
| X | 30.00 | Y | 0.00 | Z | 0.00 |
| α | 0.00 | β | 0.00 | γ | 0.00 |

| Displacement and tilt (2) | | | | | |
|---|---|---|---|---|---|
| X | 0.00 | Y | 0.00 | Z | 255.00 |
| α | 22.50 | β | 0.00 | γ | 0.00 |

| Displacement and tilt (3) | | | | | |
|---|---|---|---|---|---|
| X | 0.00 | Y | 0.00 | Z | 260.00 |
| α | 22.50 | β | 0.00 | γ | 0.00 |

| Displacement and tilt (4) | | | | | |
|---|---|---|---|---|---|
| X | 0.00 | Y | −75.00 | Z | 180.00 |
| α | 67.50 | β | 0.00 | γ | 0.00 |

| Displacement and tilt (5) | | | | | |
|---|---|---|---|---|---|
| X | 0.00 | Y | −80.00 | Z | 180.00 |
| α | 67.50 | β | 0.00 | γ | 0.00 |

| Displacement and tilt (6) | | | | | |
|---|---|---|---|---|---|
| X | 0.00 | Y | 78.98 | Z | 181.37 |
| α | 90.00 | β | 0.00 | γ | 0.00 |

Figure 13:
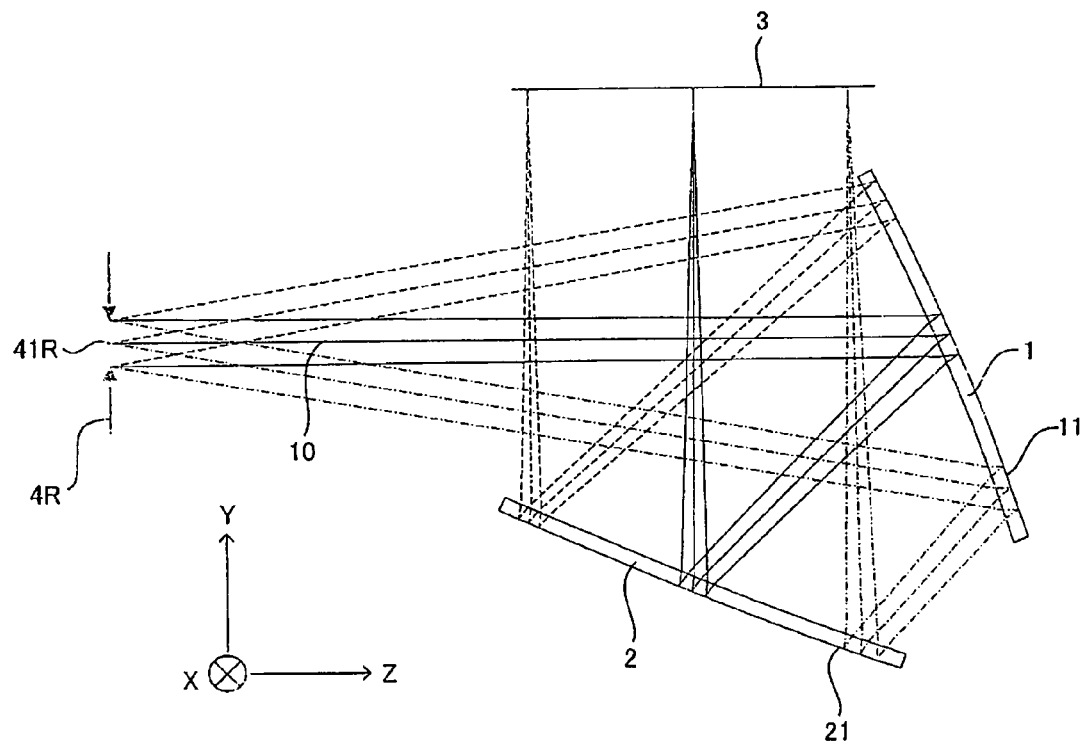
FIG. 13 is a Y-Z cross-sectional diagram containing a central optical ray of an optical system according to Example 5 of the present invention and also a projection view of optical rays.
Figure 14:
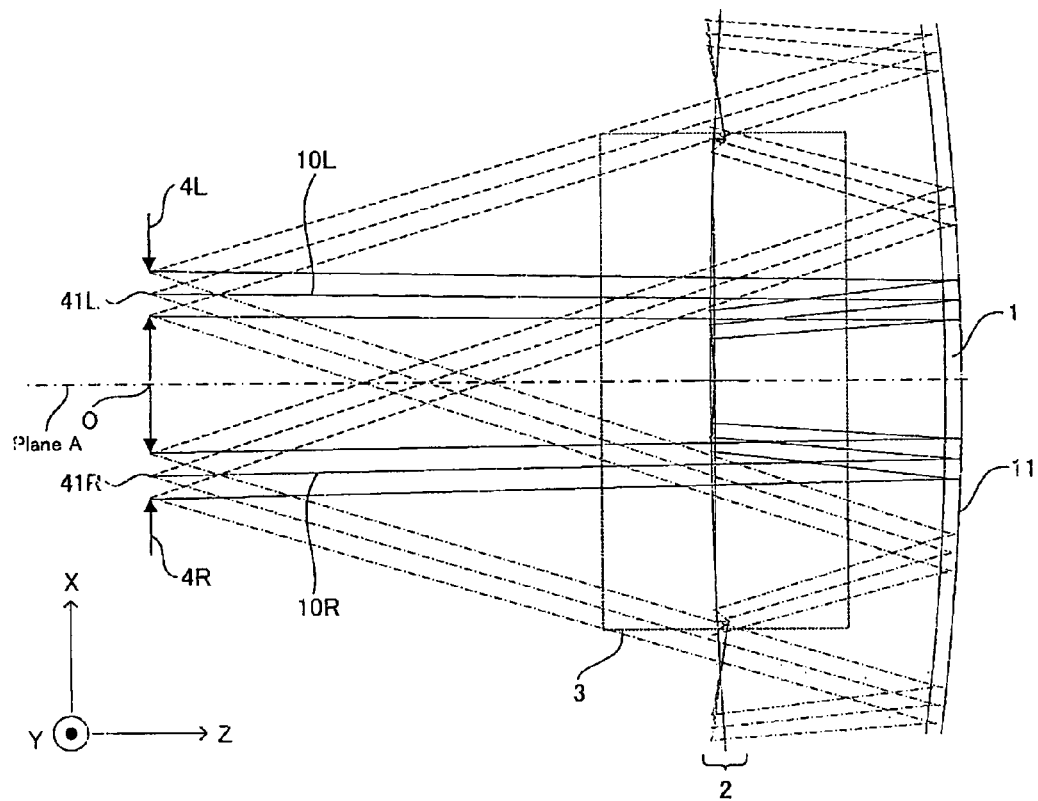
FIG. 14 is an X-Z cross-sectional diagram containing the central optical ray of the optical system according to Example 5 of the present invention and also a projection view of optical rays.

As for Example 5, the configuration and numerical example will be described with reference to FIGS. 13 to 15. FIG. 13 is a Y-Z cross-sectional diagram containing a central optical ray of an optical system according to Example 5 and also a projection view of optical rays. FIG. 14 is an X-Z cross-sectional diagram containing the central optical ray of the optical system according to Example 5 and also a projection view of optical rays. What is illustrated in the above diagrams is an optical ray travelling from diaphragms 4 to the image plane 3 (two-dimensional image displaying plane) because of reverse ray tracing.

As shown in FIG. 13, the visual display device of the present embodiment is so formed as to include the image plane 3 (two-dimensional image displaying plane), which displays an image, and an eyepiece optical system, which includes the first optical element 1 and the second optical element 2. The eyepiece optical system forms two eye points (equivalent to the diaphragms 4) to bring an observation image displayed on the image plane 3 to both eyes of an observer.

The image plane 3 represents a plane on which an image is displayed. As described in Example 1, the image plane 3 can be formed by a variety of display elements including a projection optical system.

The first optical element 1 and second optical element 2 are optical elements that have the first reflection plane 11 and second reflection plane 21 (which are what are called "back-surface mirrors"), respectively, on the back sides. Incidentally, the first optical element 1, which is positioned so as to face an eye point, may be made semi-transmissive to act as a so-called combiner to display an image of the outside world and an electronic image in such a way that the images are superimposed.

An image formed on the image plane 3 (two-dimensional image displaying plane) is reflected by the second reflection plane 21 of the second optical element 2 and by the first reflection plane 11 of the first optical element 1 before being brought to the diaphragms 4 through which an observer observes the image. According to the present embodiment, since the position of a virtual image associated with diopter is substantially the same as the position of a virtual image associated with convergence, an observation image is provided in a way that reduces eye strain for an observer. The position of a virtual image associated with diopter and the position of a virtual image associated with convergence, as well as the differences in diopter of both the positions, will be described later along with those of the other examples.

Figure 15:
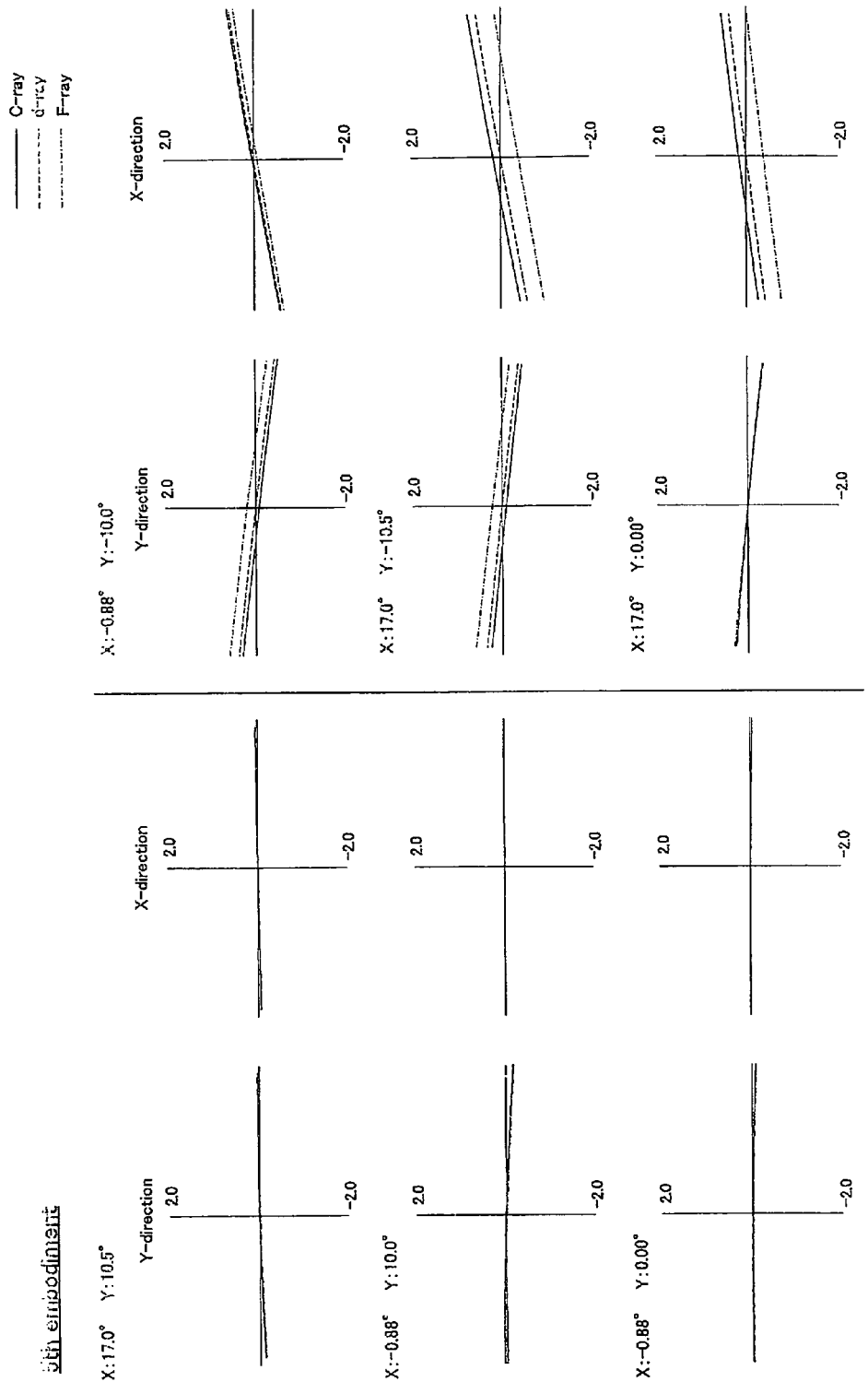
FIG. 15 is a diagram showing lateral aberrations of the entire optical system according to Example 5 of the present invention.

FIG. 15 is a diagram showing lateral aberrations of the entire optical system of Example 5. In the diagram showing lateral aberrations, top-left angles represent a "horizontal angle of field and vertical angle of field"; lateral aberrations of the y-direction (meridional direction) and x-direction (sagittal direction) are shown with the above angles of field. Incidentally, as for a horizontal angle of field, a minus angle of field represents a clockwise angle when facing in the positive direction of the y-axis; as for a vertical angle of field, a minus angle of field represents a clockwise angle when facing in the positive direction of the x-axis.

Numerical Example 5

Unit mm
Angle of view  35°
Vertical angle of view  20°
Radius of entrance pupil (Reverse ray tracing)  15.00

| Surface No. | Curvature radius | Plane gap | Displacement and tilt | Refractive index | Abbe No. |
|---|---|---|---|---|---|
| Object Plane | Cylindrical[1] | −2000.00 | | | |
| 1 | Stop | | (1) | | |
| 2 | FFS[1] | | (2) | 1.4918 | 57.4 |
| 3 | FFS[1] (Reflective) | | (3) | 1.4918 | 57.4 |
| 4 | FFS[1] | | (2) | | |
| 5 | FFS[2] | | (4) | 1.4918 | 57.4 |
| 6 | FFS[2] (Reflective) | | (5) | 1.4918 | 57.4 |
| 7 | FFS[2] | | (4) | | |
| Image Plane | ∞ | | (6) | | |

| Cylindrical[1] | | | |
|---|---|---|---|
| X-direction curvature radius | | −2000.00 | |
| Y-direction curvature radius | | ∞ | |

| FFS[1] | | | | | |
|---|---|---|---|---|---|
| C4 | −5.4853e−004 | C6 | −6.1811e−004 | C8 | 7.7508e−007 |
| C10 | −4.2317e−007 | C11 | −1.1524e−009 | C13 | −4.6044e−009 |
| C15 | −7.7566e−010 | C68 | 1.0000e+000 | | |

-continued

Unit mm
Angle of view 35°
Vertical angle of view 20°
Radius of entrance pupil (Reverse ray tracing) 15.00

FFS[2]

| C4 | 7.0817e−004 | C6 | 2.9023e−004 | C8 | 2.3776e−006 |
|---|---|---|---|---|---|
| C10 | −7.1659e−007 | C11 | −4.6255e−011 | C13 | −1.3687e−009 |
| C15 | −1.7104e−009 | C68 | 1.0000e+000 | | |

Displacement and tilt (1)

| X | 30.00 | Y | 0.00 | Z | 0.00 |
|---|---|---|---|---|---|
| α | 0.00 | β | 0.00 | γ | 0.00 |

Displacement and tilt (2)

| X | 0.00 | Y | 0.00 | Z | 255.00 |
|---|---|---|---|---|---|
| α | 22.50 | β | 0.00 | γ | 0.00 |

Displacement and tilt (3)

| X | 0.00 | Y | 0.00 | Z | 260.00 |
|---|---|---|---|---|---|
| α | 22.50 | β | 0.00 | γ | 0.00 |

Displacement and tilt (4)

| X | 0.00 | Y | −75.00 | Z | 180.00 |
|---|---|---|---|---|---|
| α | 67.50 | β | 0.00 | γ | 0.00 |

Displacement and tilt (5)

| X | 0.00 | Y | −80.00 | Z | 180.00 |
|---|---|---|---|---|---|
| α | 67.50 | β | 0.00 | γ | 0.00 |

Displacement and tilt (6)

| X | 0.00 | Y | 78.98 | Z | 181.36 |
|---|---|---|---|---|---|
| α | 90.00 | β | 0.00 | γ | 0.00 |

The above has described the configurations and numerical examples of Example 1 to Example 5. As for the position of a virtual image associated with convergence (Unit: mm), the position of a virtual image associated with diopter (Unit: mm) and the differences in diopter (or the differences of the inverses of convergence, diopter and each virtual image's position) of both the positions, values are shown below. The absolute value of the diopter difference S (Unit: $m^{-1}$) may be set at 0.5 or less to reduce eye strain of an observer to a certain degree. It is preferable that the absolute value of the diopter difference S be set at 0.2 or less by adopting the configuration of the present embodiments to further reduce eye strain for an observer. It is more preferable to adopt a free-form surface for the first and second reflection planes 11 and 21, as in Example 4 and Example 5, and therefore reduce the absolute value of the diopter difference S to 0.1 or less to create more advantageous effects.

Figure 16:
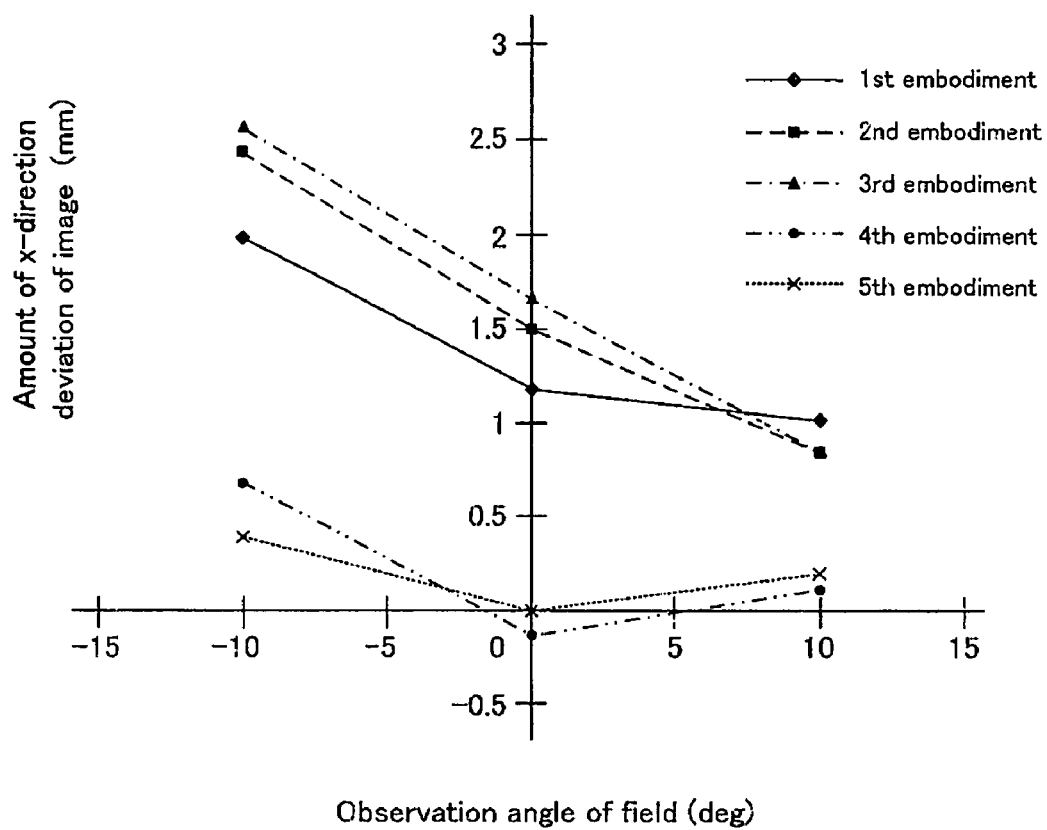
FIG. 16 is a diagram showing the amount of deviation of an image in the x-direction relative to an observation angle of field for each of the examples of the present invention.

FIG. 16 shows the amount of deviation (mm) of an image in the x-direction relative to an observation angle of field (Unit: deg) for each of Example 1 to Example 5. It is clear from FIG. 16 that the amount of deviation of an image is small in the cases of Example 4 and Example 5 that adopt a free-form surface.

The following shows an absolute value of the ratio of the focal distance F1 of the first optical element 1 relative to the focal distance F2 of the second optical element 2 for x- and y-directions. According to the present embodiments, the lower limit of the absolute value is set at 0.1 and the upper limit at 2. In this manner, the balance of power between the first and second optical elements 1 and 2 is taken into account to keep eccentric aberrations from happening. Incidentally, only Example 4 and Example 5 that adopt a free-form surface have values of |F1X/F2X|.

|  | Example 1 | Example 2 | Example 3 | Example 4 | Example 5 |
|---|---|---|---|---|---|
| |F1X/F2X| |  |  |  | 1.274 | 1.300 |
| |F1Y/F2Y| | 0.784 | 0.441 | 0.410 | 0.711 | 0.454 |

Incidentally, at least either the first reflection plane 11 or second reflection plane 21 may adopt a toric surface, which is not mentioned in the above examples. In particular, in order to correct astigmatism that occurs frequently, it is possible to change the curvature of the Y-Z section and X-Z section by applying a toric surface to the first reflection plane 11, which is close to an eye point on an optical path extending from the eye point to a display plane. Therefore, it is possible to correct astigmatism. It is also possible to correct the position of a virtual image associated with convergence in an effective manner as well as to keep astigmatism from happening.

The above has described various embodiments of the present invention. However, the present invention is not limited to the above embodiments. An embodiment in which the configurations of the above embodiments are appropriately combined comes within the scope of the present invention.

The invention claimed is:

1. A visual display device including one two-dimensional image displaying plane on which an observation image is displayed and an eyepiece optical system that forms two eye points to bring the observation image to both eyes of an observer, wherein:
   the eyepiece optical system includes at least a first optical element having a first reflection plane, and a second optical element having a second reflection plane;
   the first reflection plane is so disposed as to face the eye point in order of an optical path of reverse tracing that extends from the eye point to the two-dimensional image displaying plane;
   the second reflection plane is so disposed as to face the two-dimensional image displaying plane, and an optical axis connecting the first reflection plane to the eye point is so disposed as to cross an optical axis connecting the second reflection plane to the two-dimensional image displaying plane;
   both the first and second reflection planes have positive power; and

|  | Example 1 | Example 2 | Example 3 | Example 4 | Example 5 |
|---|---|---|---|---|---|
| Position of virtual image associated with convergence | 1544 | 1477 | 1449 | 2024 | 1960 |
| Position of virtual image associated with diopter | 2000 | 2000 | 2000 | 2000 | 2000 |
| Diopter difference S | 0.148 | 0.177 | 0.190 | −0.00593 | 0.0102 | diopter difference S (m$^{-1}$) of the position of a virtual image associated with diopter is substantially equal to that of the position of a virtual image associated with convergence.

2. The visual display device according to claim 1, wherein the diopter difference S (m$^{-1}$) of the position of a virtual image associated with diopter and the diopter difference S (m$^{-1}$) of the position of a virtual image associated with convergence satisfy the following conditional expression (1):

$$-0.5 \leq S \leq 0.5 \tag{1}$$

3. The visual display device according to claim 1, wherein the diopter difference S (m$^{-1}$) of the position of a virtual image associated with diopter and the diopter difference S (m$^{-1}$) of the position of a virtual image associated with convergence satisfy the following conditional expression (2):

$$-0.2 \leq S \leq 0.2 \tag{2}$$

4. The visual display device according to claim 1, wherein at least either the first or second reflection plane is a free-form surface.

5. The visual display device according to 4, wherein at least either the first or second reflection plane is of a shape whose curvature gradually decreases in the direction of a line connecting the two eye points as the distance between the first and second reflection planes becomes shorter.

6. The visual display device according to claim 1, wherein when the focal distance of the first optical element and the focal distance of the second optical element are represented by F1 and F2, respectively, in order of an optical path that extends from the eye point to the two-dimensional image displaying plane, the following conditional expression (3) is satisfied:

$$0.1 < |F1/F2| < 2 \tag{3}$$

* * * * *